J. J. GROMME.
KNIFE ADJUSTING MEANS FOR FEED CUTTERS.
APPLICATION FILED OCT. 9, 1909.

958,743.

Patented May 24, 1910.

Witnesses
L. Carl Stoughton
A. L. Phelps

Inventor
John J. Gromme
By C. C. Shepherd
Attorney

UNITED STATES PATENT OFFICE.

JOHN J. GROMMË, OF LANCASTER, OHIO, ASSIGNOR TO THE HOCKING VALLEY MANUFACTURING COMPANY, OF LANCASTER, OHIO, A CORPORATION OF OHIO.

KNIFE-ADJUSTING MEANS FOR FEED-CUTTERS.

958,743.  Specification of Letters Patent.  Patented May 24, 1910.

Application filed October 9, 1909. Serial No. 521,930.

*To all whom it may concern:*

Be it known that I, JOHN J. GROMMË, a citizen of the United States, residing at Lancaster, in the county of Fairfield and State of Ohio, have invented certain new and useful Improvements in Knife-Adjusting Means for Feed-Cutters, of which the following is a specification.

My invention relates to the improvement of knife adjusting means for feed cutters of that class in which tangentially arranged cutter blades or knives are carried on a rotating fly wheel within a feed cutter casing for the purpose of cutting material for feeding live stock.

The object of my invention is to provide simple and effective means for adjusting or moving the knives or cutter blades outward or inward with relation to the fly wheel from which they are supported, whereby said knives or cutter blades may be moved or adjusted to positions parallel with the shear bar.

This object I accomplish in the manner illustrated in the accompanying drawing and set forth in the accompanying claims, in which—

Figure 1:
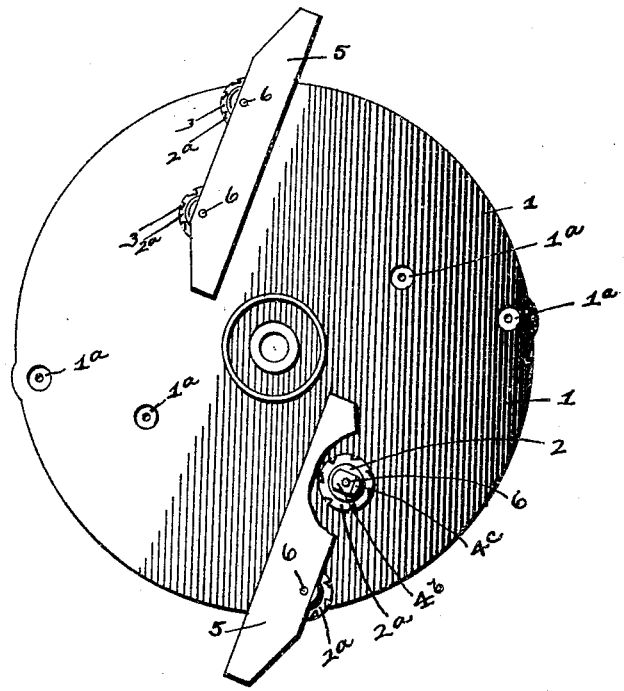
Figure 2:
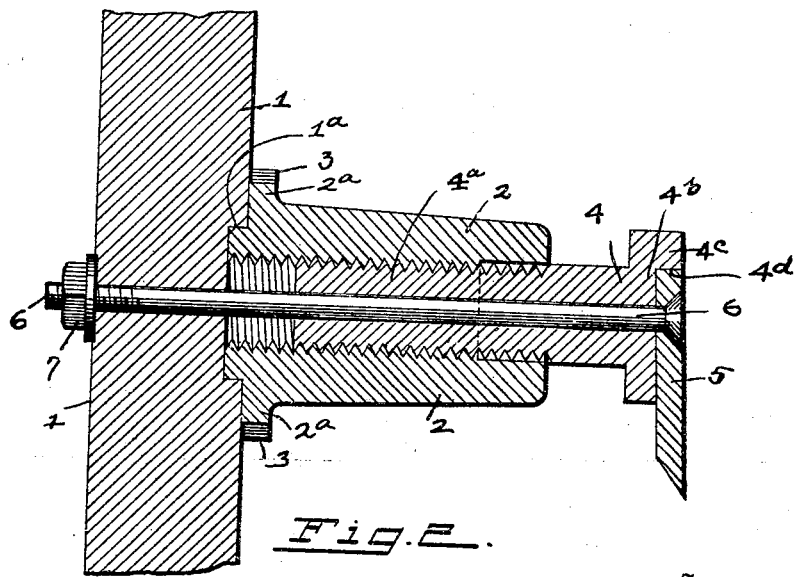

Figure 1 is a face view of a fly wheel showing two knives or cutting blades supported in connection therewith by my improved supporting means, and, Fig. 2 is an enlarged central section through one of the cutter blade supporting devices and through a portion of the fly wheel.

Similar numerals refer to similar parts throughout the several views.

1 represents the usual form of cutter carrying fly wheel or disk, such as is ordinarily employed in the construction of feed cutters of the character hereinbefore mentioned.

Formed at desirable intervals in the outer face of the wheel 1, are pairs of sockets $1^a$, the sockets of each pair being arranged in desirable alinement or on a line in the direction of the cutter blade, which is to be supported on the outer side thereof. Into the sockets of each pair are designed to be fitted the inner reduced end portions of tubular and internally threaded supporting posts 2, the latter extending outwardly at right angles with the face of the wheel or disk 1. On its inner end portion each of the posts 2 is formed with a flange $2^a$ which abuts against the face of the wheel 1 and in said flange portion is formed at intervals suitably inclined teeth 3.

Screwed into each of the tubular posts 2 from the outer end thereof, is the threaded stem $4^a$ of a knife carrying body 4, the outer portion of said stem being unthreaded, as shown, and being formed with a plate-like head or terminal enlargement $4^b$, with the outer face of which is formed adjacent to one end, a transverse raised portion $4^c$, which results in the formation of a transverse shoulder $4^d$. Against these shoulders $4^d$ of each pair of the knife holding members 4 is made to abut the inner or unsharpened edge portion of a cutter blade 5, this blade being in the nature of a bar having its outer edge suitably sharpened, said bar being thus supported tangentially with reference to the center of the disk or wheel 1 and having its outer end portion extending beyond the periphery of said wheel in the usual manner. The cutter blades formed as described, are secured in their positions $4^d$ of each pair of the knife holding members 4, by means of a bolt 6, the head of which is embedded, as shown, in the outer face of the cutter blade and the body of which extends longitudinally through a central bore of the member 4 and its stem $4^a$, thence through a bolt hole in the wheel 1, the rear threaded end of said bolt having screwed thereon a retaining nut 7 which is adapted to be tightened against the rear face of the wheel 1 and thereby hold the posts 2 in desirable connection with said wheel.

In the class of feed cutters to which my invention relates, it is desirable that means be provided for a proper adjustment of the cutter blades with relation to the blade carrying wheel 1. This I accomplish as will readily be understood, by imparting a desirable degree of rotation to the posts 2, which owing to their threaded engagement with the stems of the holding members 4, results in moving said holding members either outward or inward without turning the same. It will be understood that not having this adjustment to any considerable degree, it may be necessary to accomplish the above described operation by a loosening or tightening of the nut 7 of each of the bolts 6. In order to facilitate imparting a slight or desirable rotary movement to the tubular post 2, I have provided the flange 2ª thereof with the teeth 3, against which a suitable tool may be driven or hammered to impart motion to the tubular body.

From the construction which I have described, it will be seen that simple and positive means are provided for securing a desirable outward or inward adjustment of the cutter blades of a feed cutter of the character described and that this adjustment may be accomplished with comparative ease.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:—

1. In a device of the character described, the combination with a suitably supported wheel having sockets formed therein, of internally threaded tubular bodies the inner ends of which engage in said sockets, knife holding members comprising threaded stem portions and head portions having shoulders thereon, said threaded stem portions being adapted to screw into engagement with the internal threads of said tubular bodies, a cutter blade, and means for securing said cutter blade in connection with a pair of said holder heads, and means for retaining said tubular bodies in connection with said wheel.

2. In a device of the character described, the combination with a wheel having sockets formed at desirable intervals in one face thereof, of tubular internally threaded bodies having their inner end portions engaging said sockets, knife holding members comprising threaded stems which engage the internal threads of said tubular bodies and head portions having shoulders thereon, a cutter blade, and a bolt detachably uniting said cutter blade, holder member and wheel.

3. In a device of the character described, the combination with a suitably supported wheel having sockets formed therein, of internally threaded tubular bodies, the inner ends of which engage in said sockets, a toothed flange carried by each of said tubular bodies, knife holding members comprising threaded stem portions and head portions, each of said head portions having a shoulder formed thereon, a knife extending between two of said heads and having its rear edge resting against said shoulders, the threaded stem portions of the knife holding members being adapted to screw into engagement with the internal threads of said tubular bodies, bolts passing through said knives and through the threaded stem portions and through the wheel, and members threaded upon said bolts upon the rear face of the wheel.

In testimony whereof I affix my signature in presence of two witnesses.

JOHN J. GROMMË.

Witnesses:
C. W. McCleery,
J. W. McCleery.